(12) United States Patent
Xu et al.

(10) Patent No.: US 12,557,191 B2
(45) Date of Patent: Feb. 17, 2026

(54) INTEGRATED CIRCUIT AND DRIVING APPLICATION CIRCUIT FOR LED TUNNEL LAMP USING THREE-PHASE ALTERNATING-CURRENT MAINS POWER SUPPLY

(71) Applicant: HANGZHOU YIHUITONG TECHNOLOGY CO., LTD., Zhejiang (CN)

(72) Inventors: Chao Xu, Zhejiang (CN); Yifan Dai, Zhejiang (CN); Hao Xue, Zhejiang (CN); Zhengyi Wei, Zhejiang (CN)

(73) Assignee: HANGZHOU YIHUITONG TECHNOLOGY CO., LTD., Zhejiang (CN)

( * ) Notice: Subject to any disclaimer, the term of this patent is extended or adjusted under 35 U.S.C. 154(b) by 51 days.

(21) Appl. No.: 18/755,296

(22) Filed: Jun. 26, 2024

(65) Prior Publication Data

US 2024/0349408 A1 Oct. 17, 2024

Related U.S. Application Data

(63) Continuation-in-part of application No. PCT/CN2023/071297, filed on Jan. 9, 2023.

(30) Foreign Application Priority Data

Jan. 26, 2022 (CN) .......................... 202210090634.5

(51) Int. Cl.
*H05B 45/34* (2020.01)
*H05B 45/355* (2020.01)
*H05B 45/50* (2022.01)

(52) U.S. Cl.
CPC ........... *H05B 45/34* (2020.01); *H05B 45/355* (2020.01); *H05B 45/50* (2020.01)

(58) Field of Classification Search
CPC ....... H05B 45/34; H05B 45/50; H05B 45/355
See application file for complete search history.

(56) References Cited

U.S. PATENT DOCUMENTS

2024/0349408 A1* 10/2024 Xu .......................... H05B 45/50

FOREIGN PATENT DOCUMENTS

| CN | 102438378 A | * | 5/2012 |
| CN | 202406349 U | * | 8/2012 |

(Continued)

*Primary Examiner* — Adam D Houston
(74) *Attorney, Agent, or Firm* — NZ Carr Law Office (57) ABSTRACT

The invention relates to an integrated circuit and a driving application circuit for a LED tunnel lamp using a three-phase alternating-current mains power supply. The integrated circuit includes a voltage stabilizing circuit (1), an under-voltage protection circuit (2), a comparison amplification circuit (3), and a low-voltage control circuit (4). The invention has the characteristics of high LED driving power source efficiency, high power factor (PF), small harmonic distortion, high reliability, good optical strobe resistance, low cost, etc. In addition, as a result of the three-phase alternating-current mains power supply, an input voltage is high, and for tunnel lamps with the same power, the current flowing through a wire cable of an illumination system is particularly small, such that the cost of the wire cable can be greatly reduced, the power source conversion efficiency is greater than 95%, the PF is greater than 0.92, the harmonic distortion is less than 20%, the optical strobe depth is less than 20%, and the luminous efficacy is increased by more than 20%.

19 Claims, 4 Drawing Sheets

(56) References Cited

FOREIGN PATENT DOCUMENTS

| CN | 103561523 | A | | 2/2014 | |
|---|---|---|---|---|---|
| CN | 103716968 | A | | 4/2014 | |
| CN | 103209506 | B | | 2/2015 | |
| CN | 104812149 | A | * | 7/2015 | |
| CN | 107294194 | A | * | 10/2017 | ............. H05B 45/00 |
| CN | 109449882 | A | * | 3/2019 | ........... H02H 7/0822 |
| CN | 111864873 | A | * | 10/2020 | ................ H02J 7/14 |
| CN | 114126152 | A | * | 3/2022 | ............. H05B 45/34 |
| CN | 221531726 | U | * | 8/2024 | |
| JP | 2008059811 | A | * | 3/2008 | ............. H05B 45/48 |
| JP | 7333322 | B2 | * | 8/2023 | ............. F21V 23/02 |
| WO | WO-2016193028 | A1 | * | 12/2016 | ............. H02M 1/32 |

\* cited by examiner

INTEGRATED CIRCUIT AND DRIVING APPLICATION CIRCUIT FOR LED TUNNEL LAMP USING THREE-PHASE ALTERNATING-CURRENT MAINS POWER SUPPLY

CROSS-REFERENCE TO RELATED APPLICATIONS

The present application is a bypass continuation-in-Part application of International Application No. PCT/CN2023/071297, filed on Jan. 9, 2023, which claims to a priority to a Chinese patent application 202210090634.5 filed on Jan. 26, 2022, both are hereby incorporated by reference in its entirety.

BACKGROUND OF THE INVENTION

Field of the Invention

The invention relates to the field of electronics of tunnel illumination, and in particular to an integrated circuit and a driving application circuit for a LED tunnel lamp using a three-phase alternating-current mains power supply.

Description of the Related Art

The main structure of a highway tunnel generally includes a trunk, a lining and portals. At the entrance or exit of the tunnel where it is prone to collapse, an open cut is built additionally. The ancillary structures of the tunnel include waterproofing and drainage facilities, ventilation and illumination facilities, traffic signal facilities, emergency facilities, etc. In the tunnel facilities, illumination facilities are very important, and the illumination light environment in the tunnel directly affects the safety of lives and properties and the quality of life. In China, a highway tunnel is divided into four sections: an entrance section, a transition section, a middle section and an exit section. The illumination control of each section plays an important role in the light environment of the tunnel. As the tunnel illumination runs 24 hours a day and the traditional high pressure sodium lamps have the defects of high cost for energy consumption and high failure rate, LED light sources have begun to be used in tunnels instead of the traditional high pressure sodium lamps. However, the existing tunnel illumination unit must use a switch driving power source to light up the LED light sources, and the driving power source is a component of the tunnel illumination unit that is prone to failure. If the failure of tunnel illumination equipment cannot be found in time, it will endanger the traffic safety and cause hidden dangers of accidents, thus causing major traffic accidents in the tunnel. In addition of subjective factors, the occurrence of traffic accidents is sometimes objectively related to illumination equipment in the tunnel. However, the traditional tunnel illumination needs inspection and maintenance, and adjustment of intensity of tunnel illumination by human, which causes high labor cost and brings huge workload to tunnel officers. This is also an urgent problem to be solved in the process of stable and normal operation of tunnel illumination products.

As a new generation of light-emitting devices, LEDs have outstanding advantages of high efficiency and energy saving, and are being widely used instead of traditional illumination technology. The LED chip and the LED driving circuit are two key technologies in LED illumination. The LED driving circuit has decisive influence on many important parameters of LED illumination technology, such as power factor (PF), harmonic distortion (HD) and optical strobe. More importantly, the reliability of the LED driving circuit is the technical bottleneck that restricts the service life of LED illumination lamps at present.

The existing LED driving power sources are mainly divided into two types: switching power sources and alternating-current direct-drive power sources. They have their technical advantages, but also have significant technical disadvantages. For example, the switching power source has high power factor and high power source conversion efficiency and can achieve low harmonic and no optical strobe, but it has the disadvantages of complex high-voltage high-power switching circuit, poor reliability and short service life, and moreover, the problem of harmonic in switching power source technology is still difficult to solve. The alternating-current direct-drive LED technology has the advantages of simple circuit and high reliability, but has the problem of LED optical strobe.

After a detailed search in the search service system on the official website of China National Intellectual Property Administration, the following existing technologies are obtained. These existing technologies are described briefly below so as to make the inventive concept of the invention better understood and show the technical advantages and characteristics of the invention.

Existing technology 1: CN103108432A discloses a LED driver and a LED illumination device with the LED driver. However, this existing technology still has the disadvantage of high manufacturing cost and cannot realize the dimming function.

Existing technology 2: CN103561523A discloses an anti-optical-strobe circuit for a high-PF alternating-current direct-drive LED circuit. However, this existing technology has the disadvantage of complex wiring and cannot realize the dimming function.

Existing technology 3: CN103716968A discloses a direct-drive LED road illumination method capable of switching between a three-phase alternating-current mains power supply and a direct-current high-voltage power supply. However, this existing technology has the disadvantage of complex wiring and cannot realize the dimming function.

Existing technology 4: CN104135804A discloses a direct-current high-voltage direct-drive LED circuit based on three-phase current rectification and LC high-PF filtration. However, this existing technology has the disadvantage of complex wiring and cannot realize the dimming function.

Existing technology 5: CN104302072A discloses a direct-drive LED illumination system controlled by an integrated control circuit. However, this existing technology has the disadvantage of complex wiring and cannot realize the dimming function.

Existing technology 6: CN104302073A discloses a direct-drive LED illumination system controlled by an integrated control circuit. However, this existing technology has the disadvantage of complex wiring and cannot realize the dimming function.

Existing technology 7: CN104320890A discloses a high-voltage direct-drive LED illumination system. However, this existing technology has the disadvantage of complex wiring and cannot realize the dimming function.

Existing technology 8: CN104320891A discloses a direct-drive LED illumination system controlled by an integrated control circuit. However, this existing technology has the disadvantage of complex wiring and cannot realize the dimming function.

Existing technology 9: CN104320892A discloses a direct-drive LED illumination system controlled by an integrated control circuit. However, this existing technology has the disadvantage of complex wiring and cannot realize the dimming function.

Existing technology 10: CN105305854A discloses a LED illumination driving power source system for a high-voltage alternating-current system. However, this existing technology has the disadvantage of complex wiring and cannot realize the dimming function.

Existing technology 11: CN105848380A discloses a LED illumination device for a three-phase alternating-current power source and a LED illumination system. However, this existing technology has the disadvantage of complex wiring and cannot realize the dimming function.

Existing technology 12: CN203120227U discloses a LED alternating-current direct-drive circuit controlled by multiple low-pressure switching circuits. However, this existing technology has the disadvantage of complex wiring and cannot realize the dimming function.

Existing technology 13: CN204145854U discloses a direct-drive LED illumination system controlled by an integrated control circuit. However, this existing technology has the disadvantage of complex wiring and cannot realize the dimming function.

Existing technology 14: CN210807736U discloses a discrete SIMO dimming and color matching circuit. However, this existing technology has the disadvantage of complex wiring, and there is still an open circuit, a short circuit or runaway.

Existing technology 15: JP6513162B1 discloses a LED lighting system for three-phase-AC. However, this existing technology has the disadvantage of complex wiring and cannot realize the dimming function.

Existing technology 16: JP2011077009A discloses a LIGHTING SYSTEM OF TUNNEL. However, this existing technology has the disadvantage of complex wiring and cannot realize the dimming function.

Existing technology 17: JP2011238395A discloses an ILLUMINATION SYSTEM. However, this existing technology has the disadvantage of complex wiring and cannot realize the dimming function.

Existing technology 18: KR1020130007861A discloses the power supply for LED lamp. However, this existing technology has the disadvantage of complex wiring and cannot realize the dimming function.

Existing technology 19: U.S. Pat. No. 7,800,876B2 discloses a LED dimming circuit. However, this existing technology has the disadvantage of complex wiring and does not have the PWM signal dimming function.

Existing technology 20: U.S. Pat. No. 9,237,626B2 discloses a dimming drive circuit of alternating current directly-driven LED module. However, this existing technology has the disadvantage of complex wiring and does not have the PWM signal dimming function.

Existing technology 21: U.S. Pat. No. 9,445,472B2 discloses a method and circuit for driving light-emitting diodes from three-phase power source. However, this existing technology has the disadvantage of complex wiring and does not have the dimming function.

Existing technology 22: U.S. Pat. No. 10,119,691B2 discloses systems and methods for improved lighting systems. However, this existing technology has the disadvantage of complex wiring and cannot realize the dimming function.

Existing technology 23: US20080191642A1 discloses Methods and Apparatus for Operating Groups of High-Power Leds. However, this existing technology has the disadvantage of complex wiring and cannot realize the dimming function.

Existing technology 24: US20100194298A1 discloses a LED DRIVE DEVICE LED DRIVE METHOD AND LIGHTING SYSTEM. However, this existing technology has the disadvantage of complex wiring and cannot realize the dimming function.

Existing technology 25: US20100295458A1 discloses an AC LED MODULE WITH AN IMPROVED POWER FACTOR. However, this existing technology has the disadvantage of complex wiring and cannot realize the dimming function.

Existing technology 26: CN108366448B discloses a positive and negative logic LED dimming circuit and a driving power source. However, this existing technology has the disadvantage of complex wiring, and there is still an open circuit, a short circuit or runaway.

Through the description of the above existing technologies, those skilled in the art can know that the existing technologies have the following characteristics or problems:

(1) The switching power source has high power factor and high power source conversion efficiency and can achieve low harmonic and no optical strobe, but it has the disadvantages of complex high-voltage high-power switching circuit, poor reliability and short service life, and moreover, the problem of harmonic in switching power source technology is still difficult to solve.

(2) The alternating-current direct-drive LED technology has the advantages of simple circuit and high reliability, but has the problem of LED optical strobe.

(3) There is no in-depth study of the chip driving circuit, especially the connection and arrangement of chip pins, but the connection and arrangement of the chip driving circuit and the chip pins may greatly affect the two problems mentioned above, and may also affect the convenience and standardization of the assembly and adjustment of the LED illumination circuit.

Therefore, it is urgent to design an integrated circuit and a driving application circuit for a LED tunnel lamp using a three-phase alternating-current mains power supply.

BRIEF SUMMARY OF THE INVENTION

In view of the above, in order to overcome the disadvantages in the existing technologies, especially with regard to the connection and arrangement of chip pins, the invention provides an application-specific integrated circuit and a driving application circuit for a LED tunnel lamp using a three-phase alternating-current mains power supply. By means of the design of the internal circuit of the integrated circuit and the arrangement of the chip pins, the chip power supply port, the load current sampling port and the load switch control port are arranged separately. The chip power supply port is arranged individually, and connected with an external power supply source through an external chip power supply resistor, so that the size of the external chip power supply resistor may be adjusted flexibly according to the connection position and power supply voltage of the distributed driving application circuit so as to adjust the size of the power supply current of the chip, which can effectively reduce the power consumption of the distributed chips, thereby reducing the power consumption of the whole driving application circuit and also reducing harmonic distortion of the driving application circuit. By arranging the load current sampling port individually, the size of the external load current sampling resistor can be adjusted flexibly according to the connection position of the distributed driving application circuit and the setting of the external load current so as to control the sizes of the currents of the external LED loads at different connection positions, thereby improving the accuracy of the sampled current of the chip and the accuracy of switching control. Thus, the power consumption of the chip is further reduced, the harmonic distortion is further reduced, the current sampling accuracy of the external load is improved, and the switching of the working state of the LED load can be made smoother, thereby reducing the optical strobe depth of LEDs and solving the problem of LED optical strobe. By optimizing the connection and arrangement of the chip driving circuit and the chip pins, a further benefit is that the SMD assembly and dimming of the LED illumination circuit are more convenient and standardized, thereby effectively solving the above problems.

Therefore, the invention adopts the following technical solutions:

An integrated circuit for a LED tunnel lamp using a three-phase alternating-current mains power supply has the following internal circuit structure and working principle:

The integrated circuit includes a voltage stabilizing circuit, an under-voltage protection circuit, a comparison amplification circuit, and a low-voltage control circuit. A stable output voltage of the voltage stabilizing circuit is about 3.3 V. The low-voltage control circuit controls a LED load to switch between a connected working state and a shorted working state. The under-voltage protection circuit has a threshold voltage of 4.0 V, and when an external power supply voltage of the integrated circuit is lower than the threshold voltage, the under-voltage protection circuit keeps the low-voltage control circuit open so as to connect the corresponding LED load. The comparison amplification circuit has a reference voltage of about 1.2 V, and the comparison amplification circuit compares and amplifies a voltage on a current sampling resistor with the reference voltage, and outputs a control level to perform switching control on the low-voltage control circuit. When the voltage of the current sampling resistor is greater than the reference voltage, the low-voltage control circuit connects the LED load, and when the voltage of the current sampling resistor is less than the reference voltage, the low-voltage control circuit shorts the LED load. The voltage stabilizing circuit includes PNP triodes Q15 and Q16, NPN triodes Q14 and Q17 to Q21 and a resistor R4. An emitter of Q15, an emitter of Q16 and a collector of Q14 are connected with a positive power source terminal to serve as a power source port V+ of the integrated circuit, which is set as chip pins 1, 2 and 3. A base of Q15 is connected with a base of Q16 and a collector of Q16 and connected with one end of the resistor R4, and the other end of R4 is connected with a zero potential reference terminal to serve as a reference ground port V− of the integrated circuit, which is set as a chip pin 7. And a collector of Q15 is connected with a base of Q14 and a base and a collector of Q17, an emitter of Q17 is connected with a base and a collector of Q18, an emitter of Q18 is connected with a base and a collector of Q19, an emitter of Q19 is connected with a base and a collector of Q20, an emitter of Q20 is connected with a base and a collector of Q21 and connected with a base of Q22, an emitter of Q21 is connected with the zero potential reference terminal, and an emitter of Q14 serves as an output of the voltage stabilizing circuit, which is connected with emitters of Q1, Q2, Q11 and Q10. The under-voltage protection circuit includes a PNP triode Q24 and an NPN triode Q22. An emitter of Q24 is connected with the positive power source terminal, a base is connected with a collector and connected with a base of Q25 and a collector of Q22, a base of Q22 is connected with a collector of Q24, and an emitter of Q22 is connected with the zero potential reference terminal. The comparison amplification circuit includes PNP triodes Q1 to Q4, Q10 and Q11, NPN triodes Q5 to Q9, Q12 and Q13 and resistors R1 to R3, R5 and R6. Emitters of Q1, Q2, Q11 and Q10 are connected and connected with an emitter of Q14, bases of Q1, Q2, Q11 and Q10 are connected and connected with a collector of Q10 and one end of the resistor R3, the other end of R3 is connected with a collector and a base of Q9, collectors of Q1 and Q2 are connected and connected with emitters of Q3 and Q4, a base of Q3 is connected with a collector of Q5 and one end of the resistor R1, the other end of R1 is connected with the output of the voltage stabilizing circuit, a collector of the Q3 is connected with the zero potential reference terminal, a base of Q4 is connected with a collector of Q6 and one end of the resistor R2, the other end of R2 is connected with the output of the voltage stabilizing circuit, emitters of Q5 and Q6 are connected and connected with collectors of Q7 and Q8, a base of Q5 is connected with a collector of Q11 and connected with a collector and a base of Q12, an emitter of Q12 is connected with a collector and a base of Q13, an emitter of Q13 is connected with the zero potential reference terminal, a base of Q6 is connected with one end of the resistor R5, the other end of R5 is connected with one end of the resistor R6, the other end of the resistor R6 is a load current sampling port VS of the integrated circuit, which is set as chip pins 5 and 6 and connected with the external load current sampling resistor, bases of Q7, Q8 and Q9 are connected and connected with a collector of Q9, and emitters of Q7, Q8 and Q9 are connected with the zero potential reference terminal. The low-voltage control circuit includes a PNP triode Q25, an NPN triode Q23, an NPN triode Q26 and an NPN triode Q27. An emitter of Q23 is connected with the zero potential reference terminal, a base is connected with a collector of Q4 to serve as a load switching control port VP of the integrated circuit, which is set as a chip pin 4, and a collector is connected with a collector of Q25 and a base of Q26. An emitter of Q25 and collectors of Q26 and Q27 are connected with the positive power source terminal, the collector of Q26 is connected with a base of Q27, and an emitter of Q27 is connected with the external load current sampling resistor. The above four functional circuits are connected in the following way: the emitter of Q14 of the voltage stabilizing circuit, which has a stabilized voltage output of 3.3 V, is connected with the emitters of Q1, Q2, Q10 and Q11 of the comparison amplification circuit, the base and the collector of Q21 of the voltage stabilizing circuit are shorted and connected with the base of Q22 of the under-voltage protection circuit, the collector of Q4 of the comparison amplification circuit is connected with the base of Q23 of the low-voltage control circuit, the other end of the resistor R6 of the comparison amplification circuit is connected with the emitter of Q27 of the low-voltage control circuit, and the base and the emitter of Q24 of the under-voltage protection circuit are connected and connected with the base of Q25 of the low-voltage control circuit.

Further, the invention further relates to a driving application circuit including the integrated circuits, chip power supply resistors and external load current sampling resistors, which performs distributed subdivision control on a LED lamp bead load by collecting a size of a current of the LED lamp bead load. The driving application circuit includes a three-phase rectifier circuit 10, a distributed chip driving circuit and an LED load. The three-phase rectifier circuit 10 outputs a direct-current high-voltage power supply after rectifying a three-phase alternating-current mains power supply so as to be used by the LED lamp bead load and the distributed chip driving circuit. The LED load includes a plurality of LED lamp beads connected in series. The distributed chip driving circuit includes integrated circuits, chip power supply resistors and external load current sampling resistors, and performs distributed subdivision control on the LED lamp bead load by collecting sizes of currents of the LED lamp beads.

Further, the three-phase rectifier circuit includes six rectifier diodes, and outputs a direct-current high-voltage power supply after rectifying a three-phase alternating-current mains power supply. Input ports of the three-phase rectifier circuit are sequentially a first input port Vin1, a second input port Vin2 and a third input port Vin3 respectively corresponding to A-phase, B-phase and C-phase input terminals of the three-phase alternating-current mains power supply, and outputs of the three-phase rectifier circuit are direct-current high-voltage outputs, namely a power source port VH and a ground port GND, so as to be used by the LED lamp bead load and the distributed chip driving circuit.

The LED load includes a plurality of LED (light-emitting diode) lamp beads, and the LED load includes a normally-on LED lamp set subcircuit and a plurality of controlled LED lamp set subcircuits. The normally-on LED lamp set subcircuit includes a set of LEDs connected in series in a same direction. A current inflow end of the normally-on LED lamp set subcircuit is a head end of the normally-on LED lamp set subcircuit. The head end is connected with the power source port VH in the output ports of the three-phase rectifier circuit. A current outflow end of the normally-on LED lamp set subcircuit is a tail end of the normally-on LED lamp set subcircuit. The controlled LED lamp set subcircuit includes a set of LEDs connected in series in a same direction, a current inflow end of the controlled LED lamp set subcircuit is a head end of the controlled LED lamp set subcircuit, and a current outflow end of the controlled LED lamp set subcircuit is a tail end of the controlled LED lamp set subcircuit, which is driven and controlled by the distributed chip driving circuit.

The distributed chip driving circuit includes distributed chips formed by integrated circuits U, chip power supply resistors Rg and external load current sampling resistors Rs, and performs distributed switching control on the lamp set subcircuit by collecting sizes of currents of the controlled LED lamp set subcircuits. The integrated circuit U includes 8 chip pins. Chip pins 1, 2 and 3 are a chip power source port V+, a chip pin 4 is a load switching control port VP, chip pins 5 and 6 are a load current sampling port VS, a chip pin 7 is a chip reference ground port V−, and a chip pin 8 is suspended.

The head end of each controlled LED lamp set subcircuit is directly connected with the chip pin 4, i.e., the load switching control port VP, and also connected with the chip pins 1, 2 and 3 of the chip, i.e., the power source input port V+, via the chip power supply resistor Rg. The tail end of the controlled LED lamp set subcircuit is connected with the chip pins 5 and 6 of the chip, i.e., the load current sampling port VS, and one end of the external load current sampling resistor Rs, and the other end of the external load current sampling resistor Rs is connected with the chip pin 7, i.e., the zero potential reference port V−, which is the current outflow end of the controlled LED lamp set subcircuit, i.e., serves as the tail end of the controlled LED lamp set subcircuit. The normally-on LED lamp set subcircuit and the plurality of controlled LED lamp set subcircuits are sequentially connected in series head to tail, and the current outflow end of the last controlled LED lamp set subcircuit is connected with the ground port GND in the output ports of the three-phase rectifier circuit.

Based on the above, the LED tunnel lamp illumination technology for driving distributed chips using the three-phase alternating-current mains power supply according to the invention is developed based on the 220 Vac alternating-current direct-drive LED illumination technology. In terms of reliability, the invention, by inheriting the technical characteristics of alternating-current direct-drive LEDs, is much better than the technology using the switching power source, and does not have vulnerable components such as transformers, inductors, electrolytic capacitors and high-voltage-resistant MOS transistors in the switching power source, thereby ensuring the reliability from the aspect of the structure. Moreover, the loads can be allocated adaptively according to the power supply voltage, so that the invention can cope with extreme working conditions such as high and low voltages and high and low temperatures. Simple devices are used, and there is no electrolytic capacitor or high-voltage or heavy-current device, so the invention has high reliability.

Compared with the LED illumination technology using a 220 V single-phase power supply, this technology uses the three-phase alternating-current mains power supply, and overcomes the power frequency (100 Hz or 120 Hz) strobe in the single-phase alternating-current power supply, which is invisible to the naked eye, but has an impact in high-speed moving occasions. Moreover, due to the use of the direct-current high-voltage direct-drive, the utilization rate of the LED light source is high, so the luminous efficacy is greatly improved. This technology also has higher power source efficiency, and thus, has high overall efficiency. Furthermore, the three-phase power supply is naturally balanced. The invention has the following beneficial effects:

According to the integrated circuit and the driving application circuit for a LED tunnel lamp using a three-phase alternating-current mains power supply, by means of the design of the internal functional circuit of the integrated circuit and the arrangement of the chip pins, the chip power supply port, the load current sampling port and the load switch control port are arranged separately. The integrated circuit is connected with the external power supply source via the external chip power supply resistor, so that the size of the external chip power supply resistor may be adjusted flexibly according to the connection position and power supply voltage of the distributed driving application circuit so as to adjust the size of the power supply current of the chip, which can effectively reduce the power consumption of the distributed chips, thereby reducing the power consumption of the whole driving application circuit and also reducing harmonic distortion of the driving application circuit. Arranging the load current sampling port individually also has another benefit: The size of the external load current sampling resistor can be adjusted flexibly according to the connection position of the distributed driving application circuit and the setting of the external load current so as to control the sizes of the currents of the external LED loads at different connection positions, thereby improving the accuracy of the sampled current of the chip and the accuracy of switching control. Thus, the power consumption of the chip is further reduced, the harmonic distortion is further reduced, the current sampling accuracy of the external load is improved, and the switching of the working state of the LED load can be made smoother, thereby reducing the optical strobe depth of LEDs and solving the problem of LED optical strobe. By optimizing the connection and arrangement of the chip driving circuit and the chip pins, a further benefit is that the assembly and adjustment of the LED illumination circuit are more convenient and standardized. Therefore, the invention has the characteristics of high LED driving power source efficiency, high PF, small harmonic distortion, high reliability, good optical strobe resistance, low cost, etc. In addition, as a result of the three-phase alternating-current mains power supply, an input voltage is high, and for tunnel lamps with the same power, the current flowing through a wire cable of an illumination system is particularly small, such that the cost of the wire cable can be greatly reduced, the power source conversion efficiency is greater than 95%, the PF is greater than 0.92, the harmonic distortion is less than 20%, the optical strobe depth is less than 20%, and the luminous efficacy is increased by more than 20%.

DETAILED DESCRIPTION OF THE INVENTION

The technical solutions in the embodiments of the invention will be clearly and completely described below with reference to the accompanying drawings in the embodiments of the invention. It is apparent that the described embodiments are only a part, rather than all of the embodiments of the invention. All other embodiments obtained by those of ordinary skill in the art based on the embodiments of the invention without creative work are within the protection scope of the invention.

It should be noted that the installation methods, communication protocols and technical terms mentioned in the invention are technical terms that have long been clearly known in the art, so they will not be explained in detail.

Embodiment I

Figure 1:
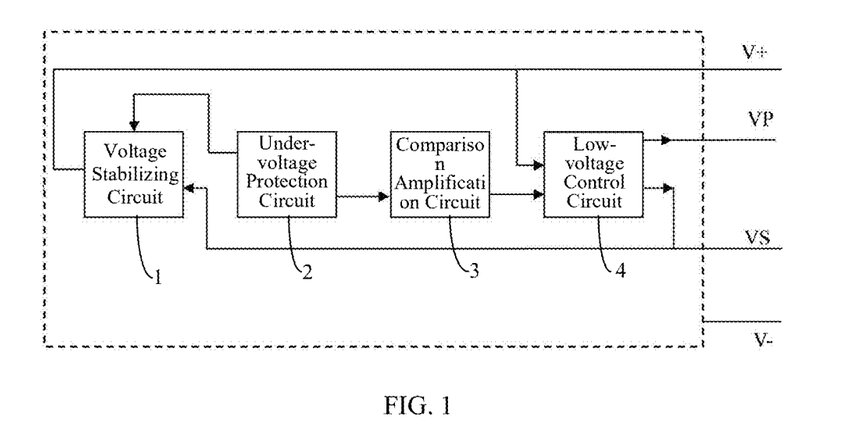
FIG. 1 is a schematic diagram of an integrated circuit for a LED tunnel lamp using a three-phase alternating-current mains power supply according to the invention.
Figure 2:
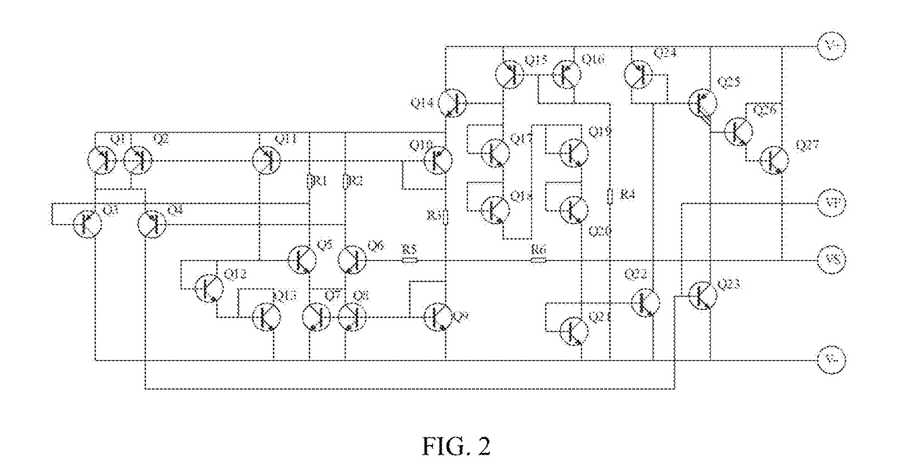
FIG. 2 is a schematic diagram of an internal circuit structure of FIG. 1.

As shown in FIG. 1 to FIG. 2, an application-specific integrated circuit and a driving application circuit for a LED tunnel lamp using a three-phase alternating-current mains power supply has the following internal circuit structure and working principle:

The integrated circuit includes a voltage stabilizing circuit 1, an under-voltage protection circuit 2, a comparison amplification circuit 3 and a low-voltage control circuit 4. A stable output voltage of the voltage stabilizing circuit is about 3.3 V. The low-voltage control circuit controls a LED load to switch between a connected working state and a shorted working state. The under-voltage protection circuit has a threshold voltage of 4.0 V, and when a voltage used by the application-specific integrated circuit is lower than the threshold voltage, the under-voltage protection circuit keeps the low-voltage control circuit open so as to connect the corresponding LED load. The comparison amplification circuit has a reference voltage of about 1.2 V, and the comparison amplification circuit compares and amplifies a voltage on a current sampling resistor with the reference voltage, and outputs a control level to perform switching control on the low-voltage control circuit. When the voltage of the current sampling resistor is greater than the reference voltage, the low-voltage control circuit connects the LED load, and when the voltage of the current sampling resistor is less than the reference voltage, the low-voltage control circuit shorts the LED load. The voltage stabilizing circuit 1 includes PNP triodes Q15 and Q16, NPN triodes Q14 and Q17 to Q21 and a resistor R4. An emitter of Q15, an emitter of Q16 and a collector of Q14 are connected with a positive power source terminal. A base of Q15 is connected with a base of Q16 and a collector of Q16 and connected with one end of the resistor R4, and the other end of R4 is connected with a zero potential reference terminal. And a collector of Q15 is connected with a base of Q14 and a base and a collector of Q17, an emitter of Q17 is connected with a base and a collector of Q18, an emitter of Q18 is connected with a base and a collector of Q19, an emitter of Q19 is connected with a base and a collector of Q20, an emitter of Q20 is connected with a base and a collector of Q21 and connected with a base of Q22, an emitter of Q21 is connected with the zero potential reference terminal, and an emitter of Q14 serves as an output of the voltage stabilizing circuit, which is connected with emitters of Q1, Q2, Q11 and Q10. The under-voltage protection circuit 2 includes a PNP triode Q24 and an NPN triode Q22. An emitter of Q24 is connected with the positive power source terminal, a base is connected with a collector and connected with a base of Q25 and a collector of Q22, a base of Q22 is connected with a collector of Q21, and an emitter of Q22 is connected with the zero potential reference terminal. The comparison amplification circuit 3 includes PNP triodes Q1 to Q4, Q10 and Q11, NPN triodes Q5 to Q9, Q12 and Q13 and resistors R1 to R3, R5 and R6. Emitters of Q1, Q2, Q11 and Q10 are connected and connected with an emitter of Q14, bases of Q1, Q2, Q11 and Q10 are connected and connected with a collector of Q10 and one end of the resistor R3, the other end of R3 is connected with a collector and a base of Q9, collectors of Q1 and Q2 are connected and connected with emitters of Q3 and Q4, a base of Q3 is connected with a collector of Q5 and one end of the resistor R1, the other end of R1 is connected with the zero potential reference terminal, a collector of the Q3 is connected with the zero potential reference terminal, a base of Q4 is connected with a collector of Q6 and one end of the resistor R2, the other end of R2 is connected with the zero potential reference terminal, emitters of Q5 and Q6 are connected and connected with collectors of Q7 and Q8, a base of Q5 is connected with a collector of Q11 and connected with a collector and a base of Q12, an emitter of Q12 is connected with a collector and a base of Q13, an emitter of Q13 is connected with the zero potential reference terminal, a base of Q6 is connected with one end of the resistor R5, the other end of R5 is connected with one end of the resistor R6, the other end of the resistor R6 is an external load current sampling resistor, bases of Q7, Q8 and Q9 are connected and connected with a collector of Q9, and emitters of Q7, Q8 and Q9 are connected with the zero potential reference terminal. The low-voltage control circuit 4 includes PNP triodes Q23, Q25, Q26 and Q27. An emitter of Q23 is connected with the zero potential reference terminal, a base is connected with a collector of Q4, and a collector is connected with a collector of Q25 and a base of Q26. An emitter of Q25 and collectors of Q26 and Q27 are connected with the positive power source terminal, the collector of Q26 is connected with a base of Q27, and an emitter of Q27 is connected with the external load current sampling resistor. The above 4 functional circuits are connected in the following way: the emitter of Q14 of the voltage stabilizing circuit 1, which has a stabilized voltage output of 3.3 V, is connected with the emitters of Q1, Q2, Q10 and Q11 of the comparison amplification circuit 3, the base and the collector of Q21 of the voltage stabilizing circuit 1 are shorted and connected with the base of Q22 of the under-voltage protection circuit 2, the collector of Q4 of the comparison amplification circuit 3 is connected with the base of Q23 of the low-voltage control circuit 4, the other end of the resistor R6 of the comparison amplification circuit 3 is connected with the emitter of Q27 of the low-voltage control circuit 4, and the base and the emitter of Q24 of the under-voltage protection circuit 2 are connected and connected with the base of Q25 of the low-voltage control circuit 4.

Embodiment II

As shown in FIG. 3 to FIG. 6, the driving application circuit in this embodiment includes the application-specific integrated circuits, chip power supply resistors and external load current sampling resistors, and performs distributed subdivision control on the LED lamp bead load by collecting the size of the current of the LED lamp bead load. The driving application circuit includes a three-phase rectifier circuit, a distributed chip driving circuit and an LED load. The three-phase rectifier circuit outputs a direct-current high-voltage power supply after rectifying a three-phase alternating-current mains power supply so as to be used by the LED lamp bead load and the distributed chip driving circuit. The LED load includes a plurality of LED lamp beads connected in series. The distributed chip driving circuit includes distributed chips formed by integrated circuits, chip power supply resistors and external load current sampling resistors, and performs distributed subdivision control on the LED lamp bead load by collecting sizes of currents of the LED lamp beads.

Figure 3:
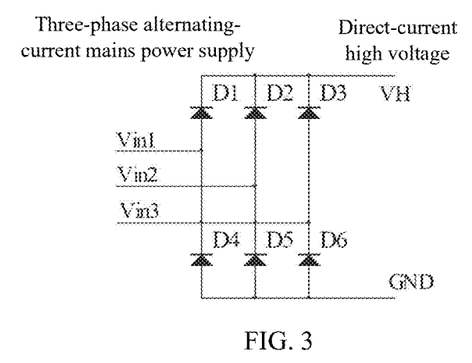
FIG. 3 is a schematic diagram of a three-phase rectifier circuit according to the invention.

Further, the three-phase rectifier circuit includes six rectifier diodes, and outputs a direct-current high-voltage power supply after rectifying a three-phase alternating-current mains power supply. Input ports of the three-phase rectifier circuit are sequentially a first input port Vin1, a second input port Vin2 and a third input port Vin3 respectively corresponding to A-phase, B-phase and C-phase input terminals of the three-phase alternating-current mains power supply, and outputs of the three-phase rectifier circuit are direct-current high-voltage outputs, namely a power source port VH and a ground port GND, so as to be used by the LED lamp bead load and the distributed chip driving circuit.

Figure 5:
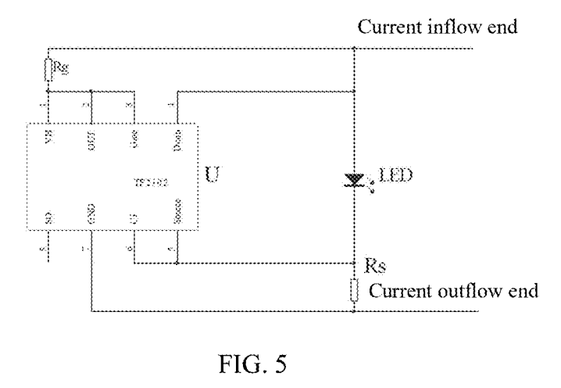
FIG. 5 is a schematic diagram of a distributed integrated circuit and a controlled LED lamp set subcircuit according to the invention.

As shown in FIG. 2 and FIG. 5, when the voltage on the current sampling resistor Rs is greater than the reference voltage, the collector of the PNP triode Q4 in the comparison amplification circuit 3 outputs a high-level signal to turn on the PNP triode Q23 in the low-voltage control circuit 4, i.e., the load switching control port VP is at a high level. The base of the PNP triode Q26 is connected to the zero potential reference port V−, the PNP triodes Q26 and Q27 are cut off, and the low-voltage control circuit 4 connects the LED load. The load switching control port VP is connected to an anode of the LED load, and the zero potential reference port V− is connected to the current sampling resistor Rs. Based on the turn-on of Q23, the voltage difference between VP and V− is only the voltage drop of the emitter of the NPN triode Q23. When driving the corresponding LED load to be turned on, this voltage difference greatly reduces the current on the current sampling resistor Rs and the power consumption on the current sampling resistor Rs, so as to improve the driving efficiency of the LED load.

Further, by arranging the load switching control port VP individually, the switching of the working state of the LED load can be made smoother. Specifically, when the LED load is in a shorted state, the low-voltage control circuit 4 is shorted, and the power source port V+ (i.e., the chip pins 1, 2 and 3) of the integrated circuit is shorted to the load current sampling port VS (i.e., the chip pins 5 and 6), and the potential on V+ is basically pulled down to the potential at VS. When the comparison amplification circuit 3 outputs a high-level VP such that the LED load is switched into a connected state, it is required to quickly establish a certain voltage difference between the two ends of the LED load in order to turn on the LED load. In this embodiment, by connecting the load switching control port VP to the anode of the LED load, while the comparison amplification circuit 3 outputs high-level VP such that the low-voltage control circuit 4 is open, the high potential on VP is immediately applied to the anode of the LED load, so that the voltage drop for driving the LED load to be turned on is quickly established between VP and the zero potential reference port V−, thereby greatly increasing the connection speed of the LED load. Similarly, when the LED load is switched from the connected state into the shorted state, the low-level VP outputted by the comparison amplification circuit 3 will also increase the pull-down speed and smoothness of the potential at the power source port V+ when the power source port V+ (i.e., the chip pins 1, 2 and 3) is shorted to the load current sampling port VS (i.e., the chip pins 5 and 6).

Figure 6:
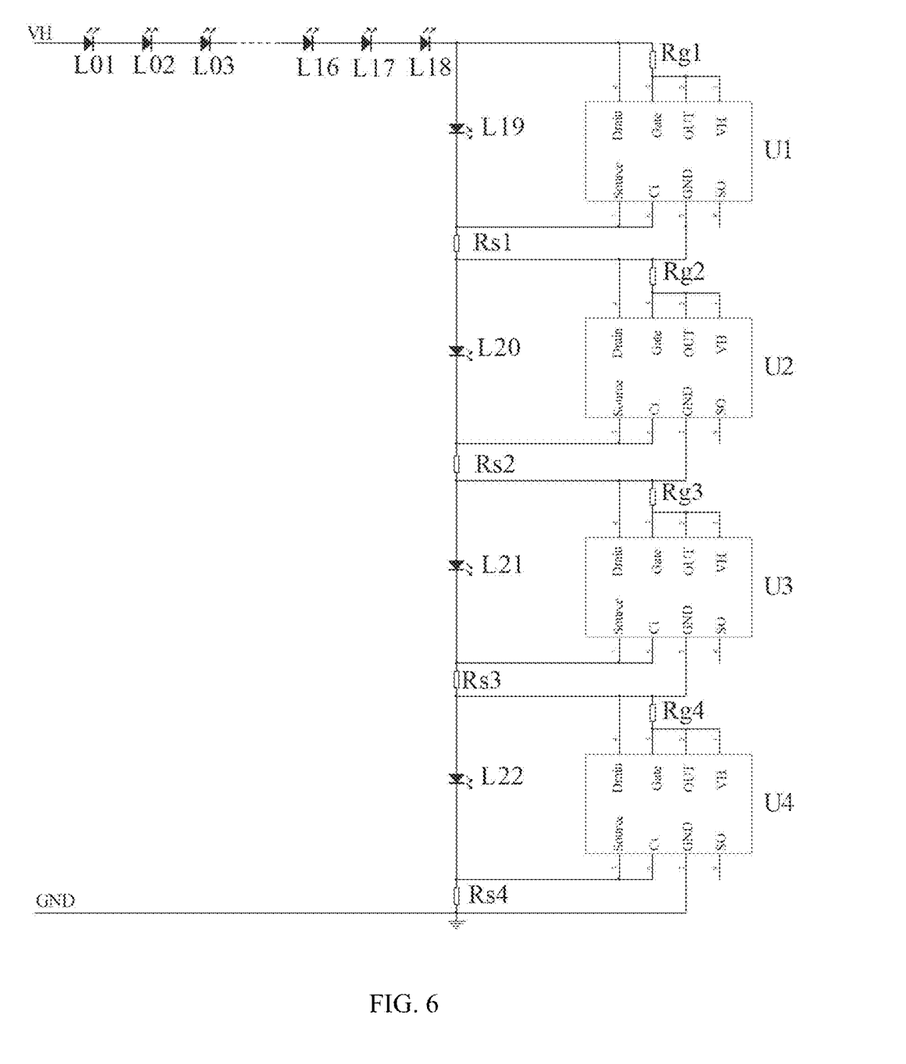
FIG. 6 is a schematic diagram of a whole circuit according to the invention.

Further, as shown in FIG. 6, the chip pins 1, 2 and 3 (V+) of the integrated circuit U1 are connected to the direct-current high-voltage VH via the chip power supply resistor Rg1, and the chip pin 4 (VP) and the anode of the LED load L19 are also connected to the direct-current high-voltage VH. The chip pins 5 and 6 (VS) are connected to the cathode of the LED load L19, and the load current sampling resistor Rs1 is connected between the chip pins 5 and 6 (VS) and the chip pin 7 (V−). The chip pin 4 (VP) on the integrated circuit U2 and the anode of the LED load L20 are connected to the chip pin 7 (V−) of the integrated circuit U1, and the chip pins 1, 2 and 3 (V+) on the integrated circuit U2 are also connected to the chip pin 7 (V−) of the integrated circuit U1 via the chip power supply resistor Rg2. That is, the zero potential reference port of the integrated circuit U1 supplies power to the integrated circuit U2 so as to form the cascade-type distributed control. The chip pins 5 and 6 (VS) of the integrated circuit U2 are connected to the cathode of the LED load L20, and the load current sampling resistor Rs2 is connected between the chip pins 5 and 6 (VS) and the chip pin 7 (V−). Based on the same principle, the chip pins 1, 2 and 3 (V+) on the integrated circuit U3 are connected to the chip pin 7 of the integrated circuit U2 via the chip power supply resistor Rg3, the anode of the LED load L21 and the chip pin 4 (VP) of U3 are also connected to the chip pin 7 of the integrated circuit U2. The chip pins 5 and 6 (VS) on the integrated circuit U3 are connected to the cathode of the LED load L21, and the load current sampling resistor Rs3 is connected between the chip pins 5 and 6 (VS) of the integrated circuit U3 and the chip pin 7 (V−). The chip pins 1, 2 and 3 (V+) on the integrated circuit U4 are connected to the chip pin 7 of the integrated circuit U3 via the chip power supply resistor Rg4, the anode of the LED load L22 and the chip pin 4 (VP) of the integrated circuit U4 are also connected to the chip pin 7 of the integrated circuit U3. The chip pins 5 and 6 (VS) on the integrated circuit U4 are connected to the cathode of the LED load L22, and the load current sampling resistor Rs4 is connected between the chip pins 5 and 6 (VS) of the integrated circuit U4 and the chip pin 7 (V−).

The cascade-type distributed control of the plurality of integrated circuits realizes individual control of each LED load or part of LED loads, thereby realizing accurate dimming. However, due to the cascade-type power supply method, the former stage integrated circuit will influence the voltage of the V+ port on the latter stage integrated circuit, thereby influencing the driving performance of the corresponding LED load on the latter stage integrated circuit, and this influence will become increasingly obvious with the increase in the number of integrated circuits connected in cascade. In this embodiment, by arranging the load switching control port VP, the anode voltage of the corresponding LED load will be clamped to the control level outputted by the comparison amplification circuit 3. The modularization of the integrated circuit and the setting of the reference voltage of the comparison amplification circuit makes the control level outputted by each comparison amplification circuit 3 consistent and stable, thereby greatly reducing the influence of the former stage integrated circuit on the latter stage integrated circuit in the cascade-type distributed control.

Figure 4:
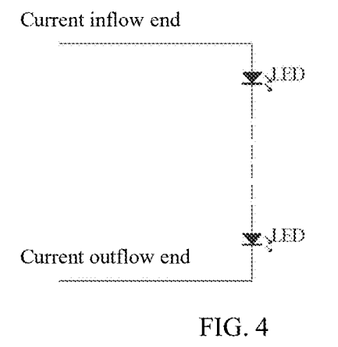
FIG. 4 is a schematic diagram of a normally-on LED lamp set subcircuit according to the invention.

The LED load includes a plurality of LED (light-emitting diode) lamp beads, and the LED load includes a normally-on LED lamp set subcircuit and a plurality of controlled LED lamp set subcircuits. The normally-on LED lamp set subcircuit includes a set of LEDs connected in series in a same direction. A current inflow end of the normally-on LED lamp set subcircuit is a head end of the normally-on LED lamp set subcircuit. The head end is connected with the power source port VH in the output ports of the three-phase rectifier circuit. A current outflow end of the normally-on LED lamp set subcircuit is a tail end of the normally-on LED lamp set subcircuit. The controlled LED lamp set subcircuit includes a set of LEDs connected in series in a same direction, a current inflow end of the controlled LED lamp set subcircuit is a head end of the controlled LED lamp set subcircuit, and a current outflow end of the controlled LED lamp set subcircuit is a tail end of the controlled LED lamp set subcircuit, which is driven and controlled by the distributed chip driving circuit.

The distributed chip driving circuit includes integrated circuits U, chip power supply resistors Rg and external load current sampling resistors Rs, and performs distributed switching control on the lamp set subcircuit by collecting sizes of currents of the controlled LED lamp set subcircuits. The integrated circuit U includes 8 chip pins. Chip pins 1, 2 and 3 are a chip power source port V+, a chip pin 4 is a load switching control port VP, chip pins 5 and 6 are a load current sampling port VS, a chip pin 7 is a chip reference ground port V−, and a chip pin 8 is suspended.

The head end of each controlled LED lamp set subcircuit is directly connected with the chip pin 4, i.e., the load switching control port VP, and also connected with the chip pins 1, 2 and 3 of the chip, i.e., the power source input port V+, via the chip power supply resistor Rg. The tail end of the controlled LED lamp set subcircuit is connected with the chip pins 5 and 6 of the chip, i.e., the load current sampling port VS, and one end of the external load current sampling resistor Rs, and the other end of the external load current sampling resistor Rs is connected with the chip pin 7, i.e., the zero potential reference port V−, which is the current outflow end of the controlled LED lamp set subcircuit, i.e., serves as the tail end of the controlled LED lamp set subcircuit. The normally-on LED lamp set subcircuit and the plurality of controlled LED lamp set subcircuits are sequentially connected in series head to tail, and the current outflow end of the last controlled LED lamp set subcircuit is connected with the ground port GND in the output ports of the three-phase rectifier circuit.

According to the circuit connection shown in the accompanying drawings, the device models and parameters in the specific embodiments are as follows: the model of the rectifier diodes D1, D2, D3, D4, D5 and D6 is SUNMATE (Taiwan) 2000 V EM520; the model of the LED lamp beads L01 to L22 is 5050 series 18 V voltage drop SAWOL60A from Seoul Semiconductor Inc. (Korea); the distributed driving chips U1, U2, U3 and U4 are the integrated circuits provided by the invention; the chip power supply resistors Rg1, Rg2, Rg3 and Rg4 are respectively 1206 SMD 30 Kohm, 45 Kohm, 60 Kohm and 75 Kohm resistors; the external load current sampling resistors Rs1, Rs2, Rs3 and Rs4 are respectively 1206 SMD 24 ohm, 20 ohm, 16 ohm and 13 ohm resistors; when a PF9830 three-phase intelligent electricity measuring instrument is used for testing electric power parameters, the test results are as follows: the power source conversion efficiency is greater than 95%, the PF is greater than 0.92, and the harmonic distortion is less than 20%; when a goniophotometer GO-2000 from EVERFINE is used for testing, the luminous efficacy reaches 160 lm/W, which is increased by more than 20% as compared with the luminous efficacy of a 220 V single-phase alternating-current direct-drive LED lamp; and when an HSP6000F light source stroboscope is used for testing, the optical strobe depth is less than 20%.

Embodiment III

This embodiment is basically the same as Embodiment I and variations thereof, except that: the driving application circuit provided by this embodiment further includes a ripple cancellation circuit 20; and the ripple cancellation circuit 20 generates a ripple signal opposite to a ripple signal carried in the driving signal, which makes the driving signal outputted after rectification a direct-current signal by means of cancellation.

As described above, the arrangement of the load switching control port VP not only reduces the power consumption of the load current sampling resistors Rs and allows rapid and smooth connection or shorting of the LED load, but also provides conditions for distributed connection of the plurality of integrated circuits. By means of the driving of the distributed LED loads, the loads can be allocated adaptively according to the power supply voltage, so that the invention can cope with extreme working conditions such as high and low voltages and high and low temperatures, thereby realizing convenient and standardized assembly and adjustment of the LED illumination circuit. However, the LED is a type of diode, and therefore also has the voltage-current characteristic of a diode, and its internal resistance is extremely small, usually between 0.1 and several ohms. Therefore, a very small change in the voltage of the LED will lead to a dramatic change in the current of the LED; and its forward current and its luminous flux are approximately linearly correlated, i.e., it can be approximately considered that the degree of fluctuation in the forward current is equal to the degree of change in the luminous flux of the LED. Therefore, the LED needs to be driven by a constant current, and a fluctuating current will cause a fluctuating luminous flux of the LED. The drive method using a three-phase alternating-current power supply in the invention needs to convert the three-phase alternating current into a direct current by rectification (the three-phase rectifier circuit shown in FIG. 3) before driving the LED load. However, during the rectification process, even a capacitor cannot effectively filter out low-frequency ripples, i.e., after the voltage is rectified, in addition to the direct-current component, there is an alternating-current component, which will be amplified by the rectifier circuit during the rectification process. Moreover, since the internal resistance of the LED is extremely small, a slight fluctuation of the voltage applied to the LED will lead to a dramatic fluctuation of the current of the LED, and a dramatic fluctuation of a forward current of the LED will lead to a dramatic fluctuation of the luminous flux of the LED, causing the strobe.

Figure 7:
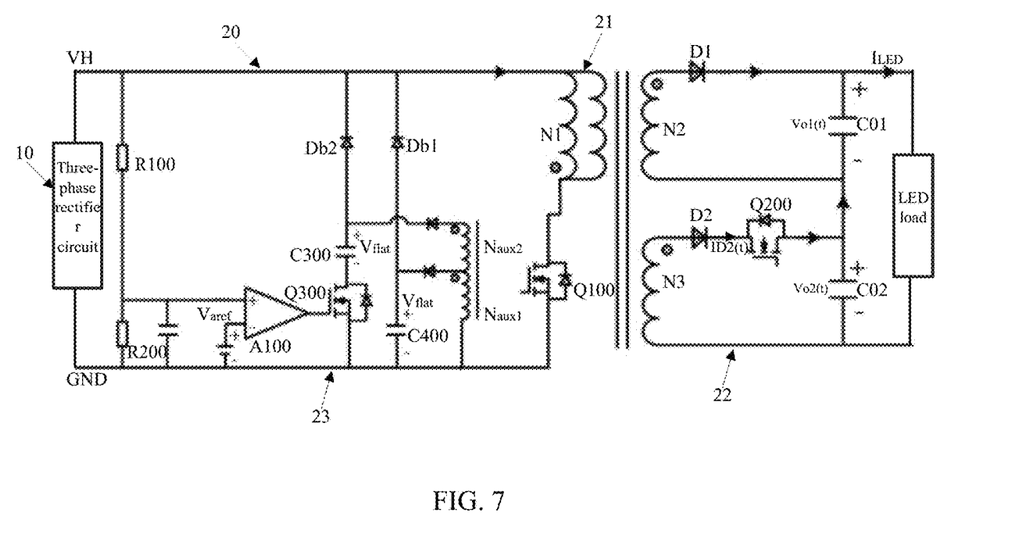
FIG. 7 is a schematic structural view of a ripple cancellation circuit according to Embodiment III of the invention.

In order to solve the problem of strobe, the driving application circuit provided by this embodiment further includes a ripple cancellation circuit 20 connected between the three-phase rectifier circuit 10 and the distributed chip driving circuit. As shown in FIG. 7, the ripple cancellation circuit 20 includes a PFC (power factor correction) converter 21 and a cancellation auxiliary circuit 22. Specifically, the signal VH converted by bridge rectification is processed by the PFC converter 21 to realize the high power factor, and the cancellation auxiliary circuit 22 is used for generating a harmonic signal opposite to the harmonic component carried in the signal outputted by the PFC converter 21 so as to realize cancellation.

In this embodiment, the PFC converter 21 includes an input side winding N1 and a master switch Q100 connected in series to an output terminal of the three-phase rectifier circuit 10, a first secondary side winding N2, and a first freewheeling diode D1 and a first capacitor C01 connected to a loop of the first secondary side winding N2. The cancellation auxiliary circuit 22 is connected in parallel to the loop of the first secondary side winding N2, and includes a second freewheeling diode D2 connected to a loop of a second secondary side winding N3, an auxiliary switch Q200 and a second capacitor C02. The second capacitor C02 is connected in series to the first capacitor C01. An upper bus of the first secondary side winding N2 is connected to an anode of the LED load, and a lower bus of the second secondary side winding N3 is connected to a cathode of the LED load.

Figure 8:
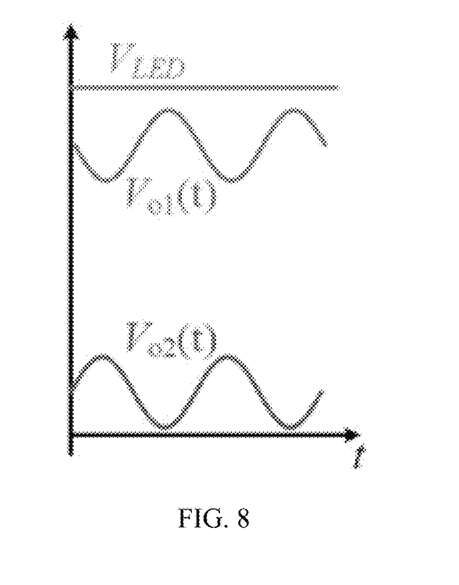
FIG. 8 is a waveform diagram of a harmonic component Vo1(t) in a primary output voltage and Vo2(t) outputted by a cancellation auxiliary circuit in FIG. 7.

The ripple cancellation circuit 20 provided by this embodiment has two output ports. The output port I has a voltage on the first capacitor C01 in the loop where the first secondary side winding N2 is located, and the output port II has a voltage on the second capacitor C02 in the loop where the second secondary side winding N3 is located. The output port I outputs a primary output voltage for driving the LED load, and the primary output voltage includes a direct-current component VLed and an alternating-current harmonic component Vo1($t$). The output port II outputs another alternating-current component Vo2($t$) opposite in direction to the alternating-current harmonic component Vo1($t$) in the primary output voltage. After Vo2($t$) and Vo1($t$) cancels each other, the pure direct-current component VLed is obtained, as shown in FIG. 8. As can be seen from FIG. 7, the direction of the current ID2($t$) flowing in the second freewheeling diode D2 of the cancellation auxiliary circuit 22 is unchangeable, so it can be considered that there are two currents in opposite directions that charge the second capacitor C02. The current ID2($t$) in the loop of the second secondary side winding N3 flows through the second capacitor C02 from top to bottom so as to charge the second capacitor in the forward direction, and the current outputted by the first secondary side winding N2 charges the second capacitor C02 from bottom to top in the reverse direction. Therefore, the forward charging time of the current ID2($t$) can be controlled by controlling the turn-on time of the auxiliary switch Q200, so that the voltage on C02 can be controlled such that the cancellation auxiliary circuit 22 can generate an alternating-current voltage Vo2($t$) which is equal in size and opposite in direction to the alternating-current harmonic component Vo1($t$) in the primary output voltage. Since the two capacitors are connected together in series, Vo1($t$) and Vo2($t$) are superimposed each other to obtain a pure direct-current output VLED, as shown in FIG. 8. In FIG. 8, t is the time.

In this embodiment, the ripple cancellation circuit 20 controls the master switch Q100 to be turned on at the beginning of each switching cycle, and the high voltage VH formed after rectifying the three-phase current charges the input side winding N1 all the time. Then, the master switch Q100 is turned off, the energy stored in the input side winding N1 is discharged to the output side via the output port I so as to realize first-stage conversion of energy. The energy discharged is converted by the first capacitor C01 to form the primary output voltage of the PFC converter 21. Then, before the output port I discharges all the energy, the auxiliary switch Q200 is turned on, so that the freewheeling diode D1 in the output port I is cut off (which can be realized by designing a turns ratio between the first secondary side winding N2 and the second secondary side winding N3), and the remaining energy is discharged through the output port II. Independent discharge of the two output ports is equivalent to the change of flow path of the energy, but it still belongs to one-stage energy conversion, thereby greatly improving the conversion efficiency. Preferably, almost 90% of energy on the input side winding N1 is discharged and converted via the output port I, and the remaining 10% of energy is discharged and converted via the output port II, thereby realizing unipolar driving.

In this embodiment, the PFC converter 21 is a flyback circuit-based topology. However, the invention is not limited thereto. In other embodiments, the PFC converter may also be a Buck-Boost circuit topology or an LLC circuit (a resonance circuit including an inductor (L), a capacitor (C) and a transformer) topology.

In the ripple cancellation circuit 20 provided by this embodiment, the auxiliary ripple cancellation voltage Vo2($t$) is maintained by the power Pin(t) provided by the input side. If the input voltage VH is excessively low, the inputted power Pin(t) will not be enough to maintain the normal operation of the cancellation auxiliary circuit 22. In order to solve this problem, the ripple cancellation circuit 20 provided by this embodiment further includes a voltage stabilizing clamping circuit 23 connected between an output terminal of the three-phase rectifier circuit 10 and the PFC converter 21. When the input voltage VH is excessively low, the voltage stabilizing clamping circuit 23 supplies power to the PFC converter 21. The voltage stabilizing clamping circuit 23 maintains the input voltage above Vflat all the time, so that the inputted power is maintained above the power required by cancelling the ripple voltage by the cancellation auxiliary circuit 22 all the time.

As shown in FIG. 7, the voltage stabilizing clamping circuit 23 includes resistors R100 and R200 connected to an output terminal of the three-phase rectifier circuit 10. A non-inverting input terminal of a comparator A100 is connected between the resistors R100 and R200, and an inverting input terminal is connected to a ground port GND of the three-phase rectifier circuit 10 via a charging capacitor so as to form a reference terminal Varef of the comparator. An output of the comparator A100 is connected to a control electrode of a switch tube Q300, a source of the switch tube Q300 is connected to the ground port GND of the three-phase rectifier circuit 10, and a drain is connected to a positive electrode of the output terminal of the three-phase rectifier circuit 10 sequentially via a clamping capacitor C300 and a diode Db2. Further, the voltage stabilizing clamping circuit 23 further includes a clamping capacitor C400 connected in parallel with the clamping capacitor C300, and a drain of the clamping capacitor C400 is also connected to the positive electrode of the output terminal of the three-phase rectifier circuit 10 via a diode Db1. A primary side auxiliary winding Naux1 is connected between the clamping capacitor C300 and the diode Db2, and a primary side auxiliary winding Naux2 is connected between the clamping capacitor C400 and the diode Db1.

Further, in order to improve the safety of the driving application circuit, in other embodiments, the driving application circuit may further include an overload protection unit. The overload protection unit is located between the three-phase alternating-current power source and the three-phase rectifier circuit 10 and protects the three-phase rectifier circuit 10 and the ripple cancellation circuit 20 from over-voltage and/or over-current. The overload protection unit may include a variety of well-known overload protection elements such as EMI filters and varistors and/or overload protection circuits, and adopt well-known technologies, so a detailed description is omitted.

For those skilled in the art, the invention is not limited to the details of the above exemplary embodiments, and the invention can be implemented in other specific forms without departing from the spirit or basic features of the invention. Therefore, from any point of view, the embodiments should be regarded as exemplary and non-limiting. The scope of the invention is defined by the appended claims rather than the description above, and therefore, it is intended that all changes falling within the meaning and scope of equivalent elements of the claims are included in the invention. Any reference signs in the claims should not be regarded as limiting the claims involved.

The above description is only the preferred embodiments of the invention and is not intended to limit the invention. Any slight modifications, equivalent substitutions and improvements of the above embodiments according to the technical essence of the invention shall fall within the protection scope of the technical solutions of the invention.

The invention claimed is:

1. An integrated circuit for a LED tunnel lamp using a three-phase alternating-current mains power supply, comprising a voltage stabilizing circuit, an under-voltage protection circuit, a comparison amplification circuit, and a low-voltage control circuit, wherein the voltage stabilizing circuit provides a stable power supply source for the integrated circuit, and is connected with an external power source through an external chip power supply resistor; the low-voltage control circuit controls a LED load to switch between a connected working state and a shorted working state; the under-voltage protection circuit has a set threshold voltage, and when an external power supply voltage of the integrated circuit is lower than the threshold voltage, the under-voltage protection circuit keeps the low-voltage control circuit open so as to connect the corresponding LED load; and the comparison amplification circuit has a set reference voltage inside, and the comparison amplification circuit compares and amplifies a voltage sampled on an external load current sampling resistor with the reference voltage, and outputs a control level to perform switching control on the low-voltage control circuit, when the voltage sampled on the external load current sampling resistor is greater than the reference voltage, the low-voltage control circuit connecting the LED load, and when the voltage sampled on the external load current sampling resistor is less than the reference voltage, the low-voltage control circuit shorting the LED load.

2. The integrated circuit for a LED tunnel lamp using a three-phase alternating-current mains power supply according to claim 1, characterized in that the voltage stabilizing circuit comprises a PNP triode Q15, a PNP triode Q16, an NPN triode Q14, an NPN triode Q17, an NPN triode Q18, an NPN triode Q19, an NPN triode Q20, an NPN triode Q21 and a resistor R4; wherein an emitter of the PNP triode Q15, an emitter of the PNP triode Q16 and a collector of the NPN triode Q14 are connected with a positive power source terminal to serve as a power source port of the integrated circuit, which is set as chip pins 1, 2 and 3; a base of the PNP triode Q15 is connected with a base of the PNP triode Q16 and a collector of the PNP triode Q16 and connected with one end of the resistor R4, and the other end of R4 is connected with a zero potential reference terminal to serve as a reference ground port of the integrated circuit, which is set as a chip pin 7; and a collector of the PNP triode Q15 is connected with a base of the NPN triode Q14 and a base and a collector of the NPN triode Q17, an emitter of the NPN triode Q17 is connected with a base and a collector of the NPN triode Q18, an emitter of the NPN triode Q18 is connected with a base and a collector of the NPN triode Q19, an emitter of the NPN triode Q19 is connected with a base and a collector of the NPN triode Q20, an emitter of the NPN triode Q20 is connected with a base and a collector of the NPN triode Q21 and connected with a base of the NPN triode Q22, an emitter of the NPN triode Q21 is connected with the zero potential reference terminal, and an emitter of the NPN triode Q14 serves as an output of the voltage stabilizing circuit, which is connected with emitters of a PNP triode Q1, a PNP triode Q2, a PNP triode Q11 and a PNP triode Q10.

3. The integrated circuit for a LED tunnel lamp using a three-phase alternating-current mains power supply according to claim 2, characterized in that the under-voltage protection circuit comprises a PNP triode Q24 and an NPN triode Q22; wherein an emitter of the PNP triode Q24 is connected with the positive power source terminal, a base is connected with a collector and connected with a base of the PNP triode Q25 and a collector of the NPN triode Q22, a base of the NPN triode Q22 is connected with a collector of the NPN triode Q21, and an emitter of the NPN triode Q22 is connected with the zero potential reference terminal.

4. The integrated circuit for a LED tunnel lamp using a three-phase alternating-current mains power supply according to claim 3, characterized in that the comparison amplification circuit comprises the PNP triode Q1, the PNP triode Q2, a PNP triode Q3, a PNP triode Q4, the PNP triode Q10, the PNP triode Q11, an NPN triode Q5, an NPN triode Q6, an NPN triode Q7, an NPN triode Q8, an NPN triode Q9, an NPN triode Q12, an NPN triode Q13, a resistor R1, a resistor R2, a resistor R3, a resistor R5 and a resistor R6; wherein emitters of the PNP triode Q1, the PNP triode Q2, the PNP triode Q11 and the PNP triode Q10 are connected and connected with an emitter of the NPN triode Q14, bases of the PNP triode Q1, the PNP triode Q2, the PNP triode Q11 and the PNP triode Q10 are connected and connected with a collector of the PNP triode Q10 and one end of the resistor R3, the other end of R3 is connected with a collector and a base of the NPN triode Q9, collectors of the PNP triode Q1 and the PNP triode Q2 are connected and connected with emitters of the PNP triode Q3 and the PNP triode Q4, a base of the PNP triode Q3 is connected with a collector of the NPN triode Q5 and one end of the resistor R1, the other end of R1 is connected with the output of the voltage stabilizing circuit, a collector of the PNP triode Q3 is connected with the zero potential reference terminal, a base of the PNP triode Q4 is connected with a collector of the NPN triode Q6 and one end of the resistor R2, the other end of R2 is connected with the output of the voltage stabilizing circuit, emitters of the NPN triode Q5 and the NPN triode Q6 are connected and connected with collectors of the NPN triode Q7 and the NPN triode Q8, a base of the NPN triode Q5 is connected with a collector of the PNP triode Q11 and connected with a collector and a base of the NPN triode Q12, an emitter of the NPN triode Q12 is connected with a collector and a base of the NPN triode Q13, an emitter of the NPN triode Q13 is connected with the zero potential reference terminal, a base of the NPN triode Q6 is connected with one end of the resistor R5, the other end of the resistor R5 is connected with one end of the resistor R6, the other end of the resistor R6 is a load current sampling port of the integrated circuit, which is set as chip pins 5 and 6 and connected with the external load current sampling resistor, bases of the NPN triode Q7, the NPN triode Q8 and the NPN triode Q9 are connected and connected with a collector of the NPN triode Q9, and emitters of the NPN triode Q7, the NPN triode Q8 and the NPN triode Q9 are connected with the zero potential reference terminal.

5. The integrated circuit for a LED tunnel lamp using a three-phase alternating-current mains power supply according to claim 4, characterized in that the low-voltage control circuit comprises an NPN triode Q23, a PNP triode Q25, an NPN triode Q26 and an NPN triode Q27; wherein an emitter of the NPN triode Q23 is connected with the zero potential reference terminal, a base is connected with a collector of the PNP triode Q4 to serve as a load switching control port of the integrated circuit, which is set as a chip pin 4, and a collector is connected with a collector of the PNP triode Q25 and a base of the NPN triode Q26; an emitter of the PNP triode Q25 and collectors of the NPN triode Q26 and the NPN triode Q27 are connected with the positive power source terminal to serve as a power source port of the integrated circuit; and a collector of the NPN triode Q26 is connected with a base of the NPN triode Q27, and an emitter of the NPN triode Q27 is connected with the external load current sampling resistor.

6. The integrated circuit for a LED tunnel lamp using a three-phase alternating-current mains power supply according to claim 1, characterized in that the emitter of the NPN triode Q14 of the voltage stabilizing circuit is connected with the emitters of the PNP triode Q1, the PNP triode Q2, the PNP triode Q10 and the PNP triode Q11 of the comparison amplification circuit, the base and the collector of the NPN triode Q21 of the voltage stabilizing circuit are shorted and connected with the base of the NPN triode Q22 of the under-voltage protection circuit, the collector of the PNP triode Q4 of the comparison amplification circuit is connected with the base of the NPN triode Q23 of the low-voltage control circuit, the other end of the resistor R6 of the comparison amplification circuit is connected with the emitter of the NPN triode Q27 of the low-voltage control circuit, and the base and the emitter of the PNP triode Q24 of the under-voltage protection circuit are connected and connected with the base of the PNP triode Q25 of the low-voltage control circuit.

7. A driving application circuit comprising the integrated circuits for a LED tunnel lamp using a three-phase alternating-current mains power supply according to claim 6, characterized in that the driving application circuit comprises a three-phase rectifier circuit, a distributed chip driving circuit and an LED load, the distributed chip driving circuit comprising the integrated circuits U for a LED tunnel lamp using a three-phase alternating-current mains power supply, chip power supply resistors Rg and external load current sampling resistors Rs.

8. The driving application circuit according to claim 7, characterized in that the three-phase rectifier circuit comprises six rectifier diodes, input ports of the three-phase rectifier circuit being sequentially a first input port Vin1, a second input port Vin2 and a third input port Vin3 respectively corresponding to A-phase, B-phase and C-phase input terminals of the three-phase alternating-current mains power supply, and output ports of the three-phase rectifier circuit being a power source port VH and a ground port GND.

9. The driving application circuit according to claim 8, characterized in that the LED load comprises a plurality of LED (light-emitting diode) lamp beads, and the LED load comprises a normally-on LED lamp set subcircuit and a plurality of controlled LED lamp set subcircuits; wherein the normally-on LED lamp set subcircuit comprises a set of LEDs connected in series in a same direction, a current inflow end of the normally-on LED lamp set subcircuit is a head end of the normally-on LED lamp set subcircuit, the head end being connected with the power source port VH in the output ports of the three-phase rectifier circuit, and a current outflow end of the normally-on LED lamp set subcircuit is a tail end of the normally-on LED lamp set subcircuit; wherein the controlled LED lamp set subcircuit comprises a set of LEDs connected in series in a same direction, a current inflow end of the controlled LED lamp set subcircuit is a head end of the controlled LED lamp set subcircuit, and a current outflow end of the controlled LED lamp set subcircuit is a tail end of the controlled LED lamp set subcircuit, which is driven and controlled by the distributed chip driving circuit.

10. The driving application circuit according to claim 9, characterized in that the driving application circuit comprises distributed chips formed by the integrated circuits U for a LED tunnel lamp using a three-phase alternating-current mains power supply, the chip power supply resistors Rg and the external load current sampling resistors Rs; the integrated circuit U comprises 8 chip pins, chip pins 1, 2 and 3 being a chip power source port, a chip pin 4 being a load switching control port, chip pins 5 and 6 being a load current sampling port, a chip pin 7 being a chip reference ground port, and a chip pin 8 being suspended; the head end of each controlled LED lamp set subcircuit is directly connected with the chip pin 4, and also connected with the chip pins 1, 2 and 3 of the chip via the chip power supply resistor Rg, which provides an external working power source for the chip; the tail end of the controlled LED lamp set subcircuit is connected with the chip pins 5 and 6 of the chip and one end of the external load current sampling resistor Rs, and the other end of the external load current sampling resistor Rs is connected with the chip pin 7 of the chip, which is the current outflow end of the controlled LED lamp set subcircuit, i.e., serves as the tail end of the controlled LED lamp set subcircuit; and the normally-on LED lamp set subcircuit and the plurality of controlled LED lamp set subcircuits are sequentially connected in series head to tail, and the current outflow end of the last controlled LED lamp set subcircuit is connected with the ground port GND in the output ports of the three-phase rectifier circuit.

11. The driving application circuit according to claim 10, characterized in that the distributed chip driving circuit comprises a plurality of integrated circuits distributed in cascade, and each integrated circuit independently drives one controlled LED or one set of controlled LEDs.

12. The driving application circuit according to claim 11, characterized in that the chip pin 4 of the latter stage integrated circuit is connected to the chip pin 7 of the former stage integrated circuit to realize distributed connection.

13. The driving application circuit according to claim 6, characterized in that the driving application circuit further comprises a ripple cancellation circuit connected between the three-phase rectifier circuit and the distributed chip driving circuit, the ripple cancellation circuit comprising a PFC (power factor correction) converter and a cancellation auxiliary circuit, and the cancellation auxiliary circuit outputting an alternating-current component opposite to a ripple component in a primary output voltage of the PFC converter to cancel the ripple component in the primary output voltage of the PFC converter.

14. The driving application circuit according to claim 13, characterized in that the PFC converter comprises an input side winding N1 and a master switch connected in series to an output terminal of the three-phase rectifier circuit, a first secondary side winding N2, and a first freewheeling diode D1 and a first capacitor C01 connected to a loop of the first secondary side winding N2.

15. The driving application circuit according to claim 13, characterized in that the cancellation auxiliary circuit is connected in parallel to the loop of the first secondary side winding N2, and comprises a second freewheeling diode D2 connected to a loop of a second secondary side winding N3, an auxiliary switch Q200 and a second capacitor C02, the second capacitor C02 being connected in series to the first capacitor C01; and an upper bus of the first secondary side winding N2 is connected to an anode of the LED load, and a lower bus of the second secondary side winding N3 is connected to a cathode of the LED load.

16. The driving application circuit according to claim 13, characterized in that the PFC converter is any one of a flyback circuit-based topology, a Buck-Boost circuit topology or an LLC circuit topology.

17. The driving application circuit according to claim 13, characterized in that the ripple cancellation circuit further comprises a voltage stabilizing clamping circuit connected between an output terminal of the three-phase rectifier circuit and the PFC converter; and when an input voltage of the PFC converter is excessively low, the voltage stabilizing clamping circuit supplies power to the PFC converter.

18. The driving application circuit according to claim 17, characterized in that the voltage stabilizing clamping circuit comprises resistors R100 and R200 connected to an output terminal of the three-phase rectifier circuit; a non-inverting input terminal of a comparator A100 is connected between the resistors R100 and R200, and an inverting input terminal is connected to a ground port GND of the three-phase rectifier circuit via a charging capacitor; an output of the comparator A100 is connected to a control electrode of a switch tube Q300, a source of the switch tube Q300 is connected to a negative electrode of the output terminal of the three-phase rectifier circuit, and a drain is connected to the output terminal of the three-phase rectifier circuit sequentially via a clamping capacitor C300 and a diode Db2; the voltage stabilizing clamping circuit further comprises a clamping capacitor C400 connected in parallel with the clamping capacitor C300, and a drain of the clamping capacitor C400 is also connected to the output terminal of the three-phase rectifier circuit via a diode Db1; a primary side auxiliary winding Naux1 is connected between the clamping capacitor C300 and the diode Db2, and a primary side auxiliary winding Naux2 is connected between the clamping capacitor C400 and the diode Db1.

19. The driving application circuit according to claim 6, characterized in that the driving application circuit comprises an overload protection unit, the overload protection unit being located between the three-phase alternating-current power source and the three-phase rectifier circuit; and the overload protection unit comprises a variety of well-known overload protection elements such as EMI filters and varistors and/or overload protection circuits.

\* \* \* \* \*